US012786202B2

(12) United States Patent
Manurangsi et al.

(10) Patent No.: US 12,786,202 B2
(45) Date of Patent: Nov. 3, 2026

(54) PRIVACY SENSITIVE ESTIMATION OF DIGITAL RESOURCE ACCESS FREQUENCY

(71) Applicant: Google LLC, Mountain View, CA (US)

(72) Inventors: Pasin Manurangsi, Bangkok (TH); Shanmugasundaram Ravikumar, Piedmont, CA (US); Pritish Kamath, Mountain View, CA (US); Badih Ghazi, Cupertino, CA (US); Kewen Wu, Berkeley, CA (US)

(73) Assignee: Google LLC, Mountain View, CA (US)

( * ) Notice: Subject to any disclaimer, the term of this patent is extended or adjusted under 35 U.S.C. 154(b) by 77 days.

(21) Appl. No.: 18/702,384

(22) PCT Filed: Oct. 19, 2023

(86) PCT No.: PCT/US2023/035471
§ 371 (c)(1),
(2) Date: Apr. 18, 2024

(87) PCT Pub. No.: WO2024/086256
PCT Pub. Date: Apr. 25, 2024

(65) Prior Publication Data

US 2025/0254179 A1 Aug. 7, 2025

Related U.S. Application Data

(60) Provisional application No. 63/417,847, filed on Oct. 20, 2022.

(51) Int. Cl.
*H04L 29/06* (2006.01)
*G06F 21/62* (2013.01)
*H04L 9/40* (2022.01)

(52) U.S. Cl.
CPC ........ *H04L 63/108* (2013.01); *G06F 21/6218* (2013.01)

(58) Field of Classification Search
CPC ........................... H04L 63/108; G06F 21/6218
(Continued)

(56) References Cited

U.S. PATENT DOCUMENTS

| | | | | |
|---|---|---|---|---|
| 7,779,265 B2 * | 8/2010 | Dubhashi | G06F 21/6218 | 713/182 |
| 11,622,156 B1 * | 4/2023 | Mendell | H04N 21/4532 | 463/25 |

(Continued)

FOREIGN PATENT DOCUMENTS

| | | |
|---|---|---|
| CN | 101266610 | 9/2008 |
| CN | 108153870 | 6/2018 |
| CN | 115147092 A | 10/2022 |

OTHER PUBLICATIONS

Xia, "A Secure and Dynamic Multi-keyword Ranked Search Scheme over Encrypted Cloud Data", 2015, IEEE, pp. 1-12 (Year: 2015).*

(Continued)

*Primary Examiner* — Taghi T Arani
*Assistant Examiner* — Gregory A Lane
(74) *Attorney, Agent, or Firm* — Fish & Richardson P.C.

(57) ABSTRACT

Methods, systems, and apparatus, including computer programs encoded on a computer storage medium, for generating an estimate for a number of users that accessed a digital resource within a time window. In one aspect, a method comprises: obtaining access data for a digital resource; generating a tree model based on the access data; selecting, for each node in the tree model, a respective private access value for the node that: (i) is an approximation of an access value for the node, and (ii) is selected from a finite set of possible private access values; and generating an estimate for the number of users that accessed the digital resource at least the predefined number of times within the
(Continued)

time window based on private access values associated with one or more nodes in the tree model.

20 Claims, 8 Drawing Sheets

(58) Field of Classification Search
USPC ........................................................ 726/4
See application file for complete search history.

(56) References Cited

U.S. PATENT DOCUMENTS

| | | | | |
|---|---|---|---|---|
| 2001/0039622 | A1* | 11/2001 | Hitz | G06F 21/6236 707/999.009 |
| 2007/0195714 | A1* | 8/2007 | Schales | H04L 47/2441 370/254 |
| 2008/0080445 | A1* | 4/2008 | Bayne | G07C 11/00 370/342 |
| 2010/0071029 | A1* | 3/2010 | Herberth | G05B 19/042 726/4 |
| 2011/0246639 | A1* | 10/2011 | Feder | G06F 1/3246 709/224 |
| 2013/0229955 | A1* | 9/2013 | Xu | H04W 52/143 370/280 |
| 2014/0214833 | A1* | 7/2014 | Ozonat | G06F 16/355 707/737 |
| 2014/0298347 | A1 | 10/2014 | Aylesworth et al. | |
| 2017/0053108 | A1* | 2/2017 | Jakobsson | G06F 21/32 |
| 2017/0324680 | A1* | 11/2017 | Tu | H04L 49/3054 |
| 2018/0109886 | A1* | 4/2018 | Nielsen | H04R 25/453 |
| 2018/0123708 | A1* | 5/2018 | Khalajmehrabadi | H04B 17/391 |
| 2020/0007556 | A1* | 1/2020 | Brebner | G06F 16/958 |
| 2022/0092045 | A1* | 3/2022 | Helland | G06F 16/2343 |
| 2022/0318641 | A1* | 10/2022 | Carreira-Perpiñán | G06N 3/0495 |

OTHER PUBLICATIONS

Zhang, "Collaborative Knowledge Base Embedding for Recommender Systems", 2016, ACM, pp. 353-362 (Year: 2016).*
Abowd et al., "An economic analysis of privacy protection and statistical accuracy as social choices" American Economic Review, Aug. 14, 2018, 10 pages.
Abowd et al., "Census topdown: Differentially private data, incremental schemas, and consistency with public knowledge" US Census Bureau, 2019, 21 pages.
Abowd et al., "The 2020 census disclosure avoidance system topdown algorithm" CoRR, Submitted on Apr. 2022, arXiv:2204.08986v1, 55 pages.
Bhaskara et al., "Unconditional differentially private mechanisms for linear queries" In Howard J. Karloff and Toniann Pitassi, editors, Proceedings of the 44th Symposium on Theory of Computing Conference, STOC 2012, New York, NY, USA, May 19-22, 2012, 15 pages.
Blasiok et al., "Towards instance-optimal private query release" Proceedings of the Thirtieth Annual ACM-SIAM Symposium on Discrete Algorithms. Society for Industrial and Applied Mathematics, 2019, 2480-2497.
Bun et al., "Differentially private release and learning of threshold functions" CoRR, Submitted on Apr. 2015, arXiv:1504.07553v1, 43 pages.
Bun et al., "Fingerprinting codes and the price of approximate differential privacy" CoRR, Submitted on Oct. 2018, arXiv:1311.3158v3, 56 pages.
Chan et al., "Private and continual release of statistics." ACM Transactions on Information and System Security (TISSEC) 14.3, Nov. 2011, 23 pages.
Cohen et al., "Census topdown: The impacts of differential privacy on redistricting" CoRR, Submitted on Mar. 2022, arXiv:2203.05085v1, 22 pages.
Cohen et al., "Private Numbers in Public Policy: Census, Differential Privacy, and Redistricting" Harvard Data Science Review, (Special Issue 2), Jun. 24, 2022, 51 pages.
Cormode et al., "Differentially private spatial decompositions" CoRR, Submitted on Mar. 2012, arXiv:1103.5170v3, 18 pages.
Ding et al., "Collecting telemetry data privately" Advances in Neural Information Processing Systems, 30, 2017, 10 pages.
Dinur et al., "Revealing information while preserving privacy" Proceedings of the twenty-second ACM SIGMOD-SIGACT-SIGART symposium on Principles of database systems, Jun. 2003, 9 pages.
Dwork et al., "Calibrating noise to sensitivity in private data analysis" J. Priv. Confidentiality, 2016, 7(3):17-51.
Dwork et al., "Differential privacy under continual observation" Proceedings of the forty-second ACM symposium on Theory of computing, Jun. 5, 2010, 10 pages.
Dwork et al., "Our data, ourselves: Privacy via distributed noise generation" Advances in Cryptology—EUROCRYPT 2006, 25th Annual International Conference on the Theory and Applications of Cryptographic Techniques, St. Petersburg, Russia, May 28-Jun. 1, 2006, 18 pages.
Dwork et al., "Pure differential privacy for rectangle queries via private partitions" International Conference on the Theory and Application of Cryptology and Information Security, Nov. 29, 2015, 17 pages.
Dwork et al., "The price of privacy and the limits of LP decoding" Proceedings of the thirty-ninth annual ACM symposium on Theory of computing, Jun. 2007, 10 pages.
Dwork et al., "The Algorithmic Foundations of Differential Privacy" Foundations and Trends in Theoretical Computer Science, vol. 9 (3-4), Aug. 2014, 281 pages.
Dwork, "Differential privacy: A survey of results" International conference on theory and applications of models of computation. Berlin, Heidelberg: Springer Berlin Heidelberg, Apr. 2008, 19 pages.
Edmonds et al., "The power of factorization mechanisms in local and central differential privacy" CoRR, Submitted on Nov. 2019, arXiv:1911.08339v1, 38 pages.
Epasto et al., "Differentially private continual releases of streaming frequency moment estimations" CoRR, Submitted on Jan. 2023, arXiv:2301.05605v1, 49 pages.
Fichtenberger et al., "Differentially private algorithms for graphs under continual observation" CoRR, Submitted on Nov. 2023, arXiv:2106.14756v2, 37 pages.
Gao et al., "An Efficient Ring-Based Metadata Management Policy for Large-Scale Distributed File Systems" IEEE Transactions on Parallel and Distributed Systems, IEEE, USA, Sep. 2019, 30(9): 1962-1974.
Geng et al., "Tight analysis of privacy and utility tradeoff in approximate differential privacy" In International Conference on Artificial Intelligence and Statistics, Jun. 2020, 10 pages.
Ghazi et al., "Private Counting of Distinct and k-Occurring Items in Time Windows" CoRR, Submitted on Nov. 2022, arXiv:2211.11718v1, 26 pages.
Hardt et al., "On the geometry of differential privacy" CoRR, Submitted on Nov. 2009, arXiv:0907.3754v3, 27 pages.
Henzinger et al., "Almost tight error bounds on differentially private continual counting" Proceedings of the 2023 Annual ACM-SIAM Symposium on Discrete Algorithms (SODA). Society for Industrial and Applied Mathematics, 2023, 37 pages.
Honaker, "Efficient use of differentially private binary trees." Theory and Practice of Differential Privacy (TPDP 2015), London, UK 2, Jan. 2015, 8 pages.
International Search Report and Witten Opinion in International Appln. No. PCT/US2023/035471, mailed on Feb. 12, 2024, 13 pages.
Kairouz et al., "Practical and private (deep) learning without sampling or shuffling." International Conference on Machine Learning. PMLR, Jul. 2021, 13 pages.
Kaplan et al., "Privately learning thresholds: Closing the exponential gap" Conference on Learning Theory. PMLR, Jul. 2020, 23 pages.

(56) References Cited

OTHER PUBLICATIONS

Lee et al., "A direct product theorem for discrepancy" 2008 23rd Annual IEEE Conference on Computational Complexity. IEEE, Jun. 2008, 23 pages.
Li et al., "The matrix mechanism: optimizing linear counting queries under differential privacy" VLDB, Dec. 2015, 24(6): 25 pages.
Machinelearning.apple.com [online], "Apple Differential Privacy Team. Learning with privacy at scale" Dec. 6, 2017, retrieved on Oct. 10, 2024, retrieved from URL <https://machinelearning.apple.com/research/learning-with-privacy-at-scale>, 9 pages.
Mathias, "The hadamard operator norm of a circulant and applications" SIAM journal on matrix analysis and applications, 14(4), 1993, 17 pages.
Matoušek et al., "Factorization Norms and Hereditary Discrepancy" CoRR, Submitted on Apr. 2015, arXiv:1408.1376v2, 33 pages.
Nikolov et al., "The geometry of differential privacy: the sparse and approximate cases" CoRR, Submitted on Dec. 2012, arXiv:1212.0297v1, 33 pages.
Nikolov, "An improved private mechanism for small databases" CoRR, Submitted on May 2015, arXiv:1505.00244v1, 14 pages.
Nikolov, "Private query release via the johnson-lindenstrauss transform" CoRR, Submitted on Aug. 2022, arXiv:2208.07410v1, 22 pages.
Qardaji et al., "Differentially private grids for geospatial data" CoRR, Submitted on Sep. 2012, arXiv:1209.1322v1, 12 pages.
Vadhan, "The complexity of differential privacy" Tutorials on the Foundations of Cryptography: Dedicated to Oded Goldreich, 2017, 96 pages.
Xiao et al., "Dpcube: Differentially private histogram release through multidimensional partitioning" CoRR, Submitted on Feb. 2012, arXiv:1202.5358v1, 14 pages.
Zhang et al., "Privtree: A differentially private algorithm for hierarchical decompositions" CoRR, Submitted on Jan. 2016, arXiv:1601.03229v1, 21 pages.
International Preliminary Report on Patentability in International Appln. No. PCT/US2023/035471, mailed on May 1, 2025, 6 pages.
Office Action in Indian Appln. No. 202417030426, mailed on Apr. 22, 2026, 7 pages (with English translation).

* cited by examiner

ACCESS ESTIMATION SYSTEM 100

PRIVACY SENSITIVE ESTIMATION OF DIGITAL RESOURCE ACCESS FREQUENCY

CROSS-REFERENCE TO RELATED APPLICATION

This application is a National Stage Application under 35 U.S.C. § 371 and claims the benefit of International Application No. PCT/US2023/035471, filed Oct. 19, 2023, which claims priority to U.S. Application No. 63/417,847, filed Oct. 20, 2022, the disclosure of which is incorporated herein by reference.

BACKGROUND

This specification relates to privacy sensitive estimation of digital resource access frequency.

Digital resources can be accessed by large numbers of remotely located users. Determining the number of users that access digital resources can be performed, e.g., as part of managing the distribution and storage of digital resources.

The extent to which a process is privacy preserving can be measured in various ways. For example, differential privacy techniques can be used to quantify the extent to which processes are privacy preserving. A computational process operating on a dataset can be referred to as being privacy sensitive (or privacy preserving), e.g., if the process is adapted to prevent the leakage of information from the dataset.

SUMMARY

This specification describes a system implemented as computer programs on one or more computers in one or more locations that can perform efficient and privacy sensitive estimation of digital resource access frequency.

According to a first aspect there is provided a method performed by one or more computers, the method comprising: obtaining access data for a digital resource, wherein the access data comprises, for each time point in a sequence of time points, data identifying a set of users that accessed the digital resource at the time point; generating a tree model based on the access data, wherein each node of the tree model is associated with a respective access value that characterizes a number of users that satisfy a node-specific selection criterion based on accessing the digital resource; selecting, for each node in the tree model, a respective private access value for the node that: (i) is an approximation of the access value for the node, and (ii) is selected from a finite set of possible private access values; receiving a request to determine a number of users that accessed the digital resource at least a predefined number of times within a time window; and in response to the request: generating the estimate for the number of users that accessed the digital resource at least the predefined number of times within the time window based on private access values associated with one or more nodes in the tree model.

In some implementations, selecting, for each node in the tree model, a respective private access value for the node comprises, at each of one or more iterations starting from a first iteration in a sequence of iterations: receiving (i) a current set of one or more sub-trees of the tree model and (ii) a current threshold value; classifying, for each node in each sub-tree in the current set of sub-trees, whether the access value for the node satisfies an acceptance criterion based on the current threshold value; identifying one or more nodes in the tree model as being target nodes for the iteration based on the classification of the nodes in the sub-trees in the current set of sub-trees; and selecting a private access value for each of the target nodes based on the current threshold value.

In some implementations, at the first iteration in the sequence of iterations, the current set of sub-trees comprises the tree model.

In some implementations, the method further comprises: identifying a next set of one or more sub-trees of the tree model, based on the classifications of the nodes in the sub-trees in the current set of sub-trees; and providing the next set of sub-trees for processing at a next iteration in the sequence of iterations.

In some implementations, for each iteration after a first iteration in the sequence of iterations, the current threshold value for the next iteration is less than the current threshold value for a preceding iteration in the sequence of iterations.

In some implementations, identifying one or more nodes in the tree model as being target nodes for the iteration based on the classifications of the nodes in the sub-tree in the current set of sub-trees comprises: identifying one or more transition nodes, wherein each transition node: (i) is included in a sub-tree in the current set of sub-trees, (ii) is classified as satisfying the acceptance criterion, and (iii) does not have child nodes that are classified as satisfying the acceptance criterion; and designating each transition node as being a target node.

In some implementations, the method further comprises designating each node that: (i) is included in a sub-tree in the current set of sub-trees, and (ii) is an ancestor node to a transition node, as being a target node.

In some implementations, at each of one or more iterations in the sequence of iterations, selecting a private access value for each of the target nodes based on the current threshold value comprises: selecting a same private access value for each of the target nodes identified at the iteration.

In some implementations, the selected private access value is within a tolerance range around the current threshold value.

In some implementations, identifying a next set of one or more sub-trees of the tree model based on the classifications of the nodes in the sub-trees in the current set of sub-trees comprises, for each transition node: designating one or more disjoint sub-trees of the transition node as being included in the next set of sub-trees.

In some implementations, classifying, for each node in each sub-tree in the current set of sub-trees, whether the access value for the node satisfies an acceptance criterion based on the current threshold value comprises, for one or more levels in one or more sub-trees in the current set of sub-trees: determining that the level in the sub-tree includes at least one node having an access value that exceeds the current threshold value; and for each node at the level in the sub-tree: generating a transformed access value for the node, comprising combining noise with the access value for the node; and classifying the access value for the node as satisfying the acceptance criterion if the transformed access value for the node exceeds the current threshold value.

In some implementations, generating the transformed access value for the node further comprises adding one or more offsets to the access value for the node.

In some implementations, combining noise with the access value for the node comprises: sampling a noise value from a probability distribution; and adding the sampled noise value to the access value for the node.

In some implementations, the probability distribution is a truncated Laplace distribution.

In some implementations, determining that the level in the sub-tree includes at least one node having an access value that exceeds the current threshold value comprises: determining that the level in the sub-tree includes at least one node having an access value that exceeds the current threshold value using a sparse vector technique.

In some implementations, for each node of the tree model: the node is associated with a respective key that specifies one or more time intervals; and the node-specific selection criterion for the node based on the one or more time intervals specified by the key for the node.

In some implementations, generating the estimate for the number of users that accessed the digital resource at least the predefined number of times within the time window based on private access values associated with one or more nodes in the tree model comprises: identifying a plurality of nodes in the tree model that each have a respective key which satisfies a selection criterion based on the time window; determining a combination of the private access values associated with the identified nodes; and generating the estimate for the number of users based at least in part on the combination of the private access values associated with the identified nodes.

In some implementations, determining the combination of the private access values associated with the identified nodes comprises: determining a sum of the private access values associated with the identified nodes.

In some implementations, identifying the plurality of nodes in the tree model comprises: identifying that one or more leaf nodes of the tree model and one or more internal nodes of the tree model each have a respective key with satisfies the selection criterion based on the time window.

In some implementations, a user accesses the digital resource by receiving a transmission of a digital component.

In some implementations, the tree model is a binary tree model.

In some implementations, the method further comprises: outputting the estimate for the number of users that accessed the digital resource at least the predetermined number of times within the time window.

In some implementations, the method further comprises modifying the digital resource based on the estimate for the number of users that accessed the digital resource.

In some implementations, modifying the digital resource comprises modifying a bit rate or resolution of the digital resource.

In some implementations, the method further comprises modifying the conditions under which the digital resource is made available to users based on the estimate for the number of users that accessed the digital resource.

In some implementations, modifying the conditions under which the digital resource is made available to users comprises modifying distribution criteria or computational resource availability.

In another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

In another aspect, there is provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

The system described in this specification can generate accurate and privacy preserving access frequency estimates. An access frequency estimate can refer to an estimate for a number of users that accessed a digital resource at least a threshold number of times during a time window; Access frequency estimates generated by the system can be referred to as being privacy preserving (or privacy sensitive), e.g., because they are adapted to prevent leakage of information about users. For instance, access frequency estimates generated by the system can satisfy criteria for being differentially private, e.g., such that the access frequency estimates cannot be leveraged to determine when and if individual users have accessed the digital resource.

The system can generate access frequency estimates that are accurate when accuracy is measured in terms of either additive error or multiplicative error, in contrast to some conventional techniques which are designed to minimize only additive error without reference to multiplicative error.

To enable generation of privacy preserving access frequency estimates, the system can process access data for a digital resource (e.g., that identifies a respective set of users that accessed the digital resource at each of multiple time points) to generate a tree model (data structure). A tree model can refer to a hierarchical structure that includes a set of nodes and a set of edges, where each edge connects a respective "parent" node to a respective "child" node, and where each node (except for a root node) has exactly one parent node.

The system can construct the tree model to encode the access data such that an access frequency estimate to be generated for any time window by combining access values associated with nodes in the tree model. To preserve privacy, the system can generate a respective "private" access value for each node in the tree model and generate access frequency estimates using the private access values for the nodes rather than the original access values.

The system can generate the private access values for the nodes in a manner that causes the access frequency estimates generated using the private access values to be privacy preserving. In particular, to generate the private access values, the system can classify each access value into an interval created by a pair of thresholds from a sequence of thresholds, and then map each access value onto a private access value representing the interval that includes the access value.

To this end, the system implements an iterative classification technique, where at each iteration, the system identifies nodes having access values that are above a corresponding threshold, and at the next iteration considers only nodes having access values below the threshold. The system can efficiently classify access values as being above or below a threshold by identifying "transition" nodes. A transition node refers to a node that: (i) has an access value that exceeds the threshold, and (ii) does not have child nodes with access values that exceed the threshold. Given the locations of the transition nodes, the system can immediately classify the other nodes. In particular, if a node is an ancestor of a transition node, then the access value for the node is above the threshold; otherwise, the access value for the node is below the threshold. Efficiently classifying access values relative to thresholds enables the system to: (i) reduce privacy loss, (ii) increase the accuracy of access frequency estimates generated using the private access values, and (iii) reduce consumption of computational resources, e.g., memory and computing power.

The system described in this specification enables reduced consumption of computational resources, e.g., memory and computing power, by enabling access frequency estimates to be generated for any time interval by combining values associated with a limited number of nodes in a tree model. In contrast, some conventional approaches for generating access frequency estimates require storing an entire set of access data (which requires more memory than storing the tree model) and processing the entire set of access data each time an access frequency estimate is generated (which consumes significantly more computing power than generating access frequency estimates by leveraging the tree model).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
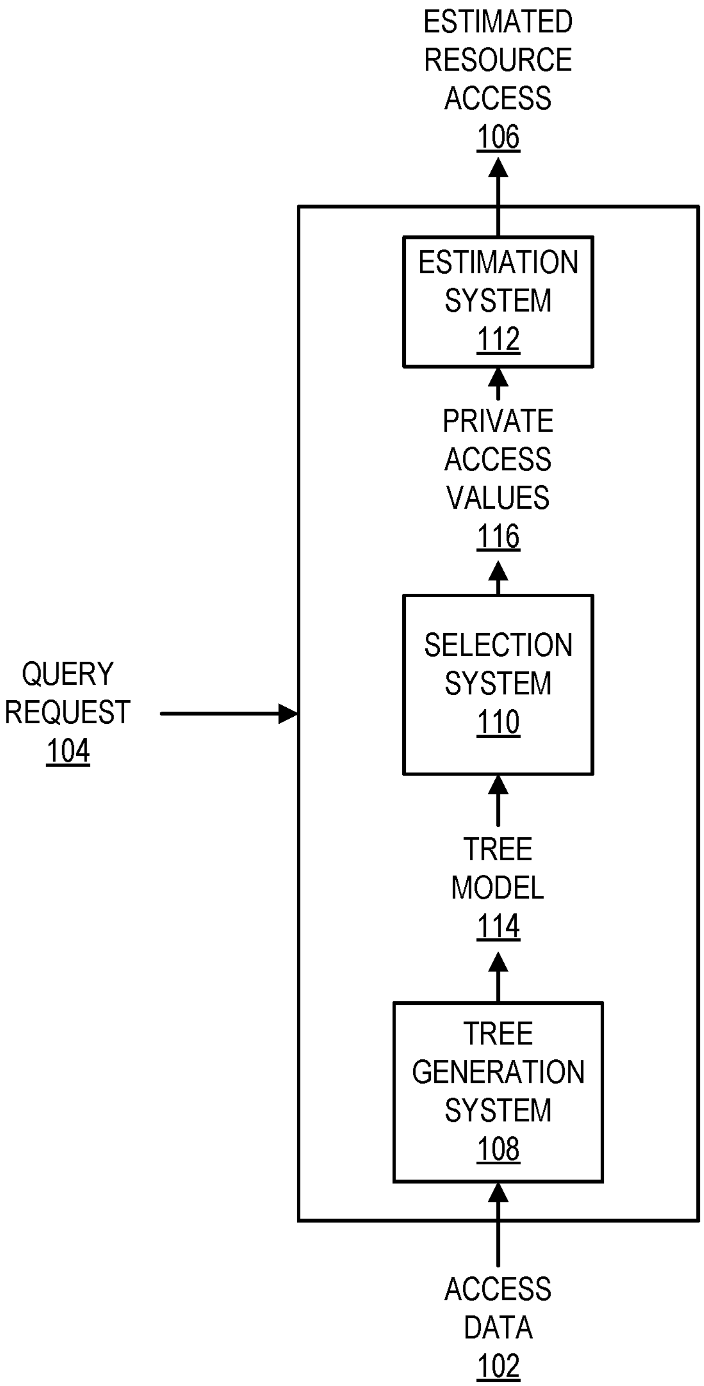
FIG. 1 is a block diagram of an example access estimation system.

FIG. 1 shows an example access estimation system 100. The access estimation system 100 is an example of a system implemented as computer programs on one or more computers in one or more locations in which the systems, components, and techniques described below are implemented.

The system 100 is configured to respond to query requests 104 regarding access data 102. Each query request 104 defines a request to produce an estimate for how many users accessed a digital resource at least a specified minimum number of times (e.g., 1 time, or 3 times, or 5 times, or 10 times, or any other appropriate number of times) in a time window specified by the query request. The system 100 responds to query requests 104 by producing corresponding privacy sensitive estimates 106 for the number of users that accessed the digital resource at least the specified minimum number of times in the time window specified by the query request.

The access data identifies, for each time point in a sequence of time points, a set of users that accessed the digital resource at the timepoint. A user can access a digital resource in any of a variety of possible ways. A few examples of possible ways that users can access digital resources are described next.

In some implementations, the digital resource can be a data storage location, e.g., a database. A user can access a database, e.g., through an application programming interface (API) made available by the database, e.g., to query information from the database, or to store information in the database, or both.

In some implementations, the digital resource can be an application or a webpage, e.g., which a user can access by way of a user interface made available on a user device. Accessing an application or a webpage can refer to interacting with the application or webpage.

In some implementations, the digital resource can be a computational resource, e.g., one or more processors (e.g., central processing units (CPUs) or graphics processing units (GPUs)) made available to users in a cloud computing environment. A user can access a computational resource, e.g., by providing data defining one or more computational tasks to be performed using the computational resource.

In some implementations, the digital resource can be a digital component, and a user can access the digital resource by receiving a transmission of the digital resource at a user device, e.g., from a digital component transmission system. An example of a digital component transmission system is described with reference to FIG. 8.

As used throughout this document, the phrase "digital components" refers to discrete units of digital content or digital information that can include one or more of, e.g., video clips, audio clips, multimedia clips, images, text segments, or uniform resource locators (URLs). A digital component can be electronically stored in a physical memory device as a single file or in a collection of files, and digital components can take the form of video files, audio files, multimedia files, image files, or text files and include streaming video, streaming audio, social network posts, blog posts, and/or advertising information, such that an advertisement is a type of digital component. Generally, a digital component is defined by (or provided by) a single source (e.g., a digital component provider), but a digital component provided from one source could be enhanced with data from another source (e.g., weather information, real time event information, or other information obtained from another source).

The request 104 can specify information determining how the system 100 generates the estimate 106. For example, the request 104 can specify the given time window for which the system 100 produces the estimate 106. As another example, the request 104 can specify a minimum number and the system 100 can generate the estimate 106 for the number of users that accessed the digital resource a number of times exceeding the specified minimum. As another example, the system 100 can obtain access data 102 for multiple digital resources, and the request 104 can specify the particular digital resource for which the system 100 produces the estimate 106.

The system 100 can use an access frequency estimate, e.g., an estimate for a number of users that accessed the digital resource at least a predefined number of times in a time window, in a variety of possible ways, a few examples of which are described next.

In some implementations, the system 100 can generate a notification indicating an access frequency estimate, and provide the notification, e.g., for display by way of a user interface.

In some implementations, the system 100 can use an access frequency estimate to determine whether a cyberattack, e.g., a distributed denial-of-service (DDOS) attack, has occurred. For instance, the system can determine that a cyberattack has occurred based at least in part on a determination that at least a threshold number of users have accessed the digital resource at least a threshold number of times within a time window.

In some implementations, the system 100 can modify conditions under which the digital resource is available to users based on an access frequency estimate. For instance, if users access the digital resource by receiving transmissions of a digital component, the system 100 can modify distribution criteria controlling when the digital resource is transmitted to users based on an access frequency estimate, e.g., to cause the digital component to be transmitted to more or fewer users.

In some implementations, the system 100 can modify a digital resource based on an access frequency estimate. For instance, if the digital resource is a computational resource (e.g., in a cloud computing environment), then the system 100 can increase or decrease the computing power available by way of the computational resource in response determining an access frequency estimate satisfies a threshold. If the digital resource is a digital component, the component could be modified such as a resolution of an image increased or decreased, or bit rate of audio or video increased or decreased dependent on an access frequency estimate to control bandwidth used during distribution of the digital resource.

The system 100 includes a tree generation system 108, a selection system 110, and an estimation system 112, which are each described in more detail below.

The tree generation system 108 is configured to process the access data 102 to produce a tree model 114 based on the access data 102. The tree model 114 structures information from the access data 102 for the purpose of generating the estimates 106. The tree generation system 108 associates each node of the tree model 114 with a particular time window for the node. The tree generation system 108 also associates each node of the tree model 114 with a respective access value that specifies a number of times that users have accessed the digital resource within the particular time window assigned to the node. The system 100 can generate estimates 106 by producing privacy sensitive approximations of the access values assigned to the nodes of the tree model 114 and computing the estimates 106 based the approximate values for the nodes required to respond to the query requests 104. Specific details regarding an example tree model 114 are described in more detail below with reference to FIG. 3. An example process for generating the tree model 114 from the access data 102 is described in more detail below with reference to FIG. 4.

The selection system 110 can process the tree model 114 to produce private access values 116 for each of the nodes within the tree model. For each node of the tree model 114, the selection system 110 assigns one of a finite set of private access values to the node that approximates the access value assigned to the node in a manner that preserves user privacy. An example process for selecting private access values 116 for the tree model 114 is described in more detail below with reference to FIG. 5.

The estimation system 112 can process the private access values 116 and the query request 104 to produce the estimate 106. In particular, the estimation system 112 can determine the relevant nodes having information required to respond to the query request 104 and can generate the estimate 106 based on the private access values 116 assigned to the relevant nodes. An example process for processing the private access values 116 is described in more detail below with reference to FIG. 6.

The system 100 can produce estimates 106 of how many users accessed the digital resource that are accurate (e.g., to within a threshold accuracy tolerance) while remaining privacy sensitive, e.g., by reducing the likelihood that the estimate can reveal private user information from the access data 102. For example, the estimates 106 can satisfy differential privacy criteria such that the estimates 106 do not reveal information regarding whether any particular user accessed the digital resource. The criterion by which the estimates 106 are considered privacy sensitive and accurate are described next.

For each node, u, of the tree model 114, $\mathcal{T}$, (i.e., $u \in \text{nodes}(\mathcal{T})$), the selection system 100 assigns a private access value to the node, $\tilde{w}_u$, that approximates the access value of the node, $w_u$. An estimate 106, $E(\mathcal{T})$, is referred to as $(\epsilon, \delta)$-differentially private if, for any neighboring tree, $\mathcal{T}'$, (i.e., any tree constructed by incrementing or decrementing the access value of exactly one of the nodes of the tree $\mathcal{T}$), the following criterion is satisfied:

$$Pr[E(\mathcal{T}) \in S] \le e^{\epsilon} Pr[E(\mathcal{T}') \in S] + \delta$$

Where S is any subset of the estimates 106 that can be returned by the system 100. When appropriately configured according to this specification, the system 100 can produce $(\epsilon, \delta)$-differentially private estimates 106.

The estimates 106 are considered $(\alpha, \eta)$-accurate, with respect to node-specific thresholds, $\tau_u$, when, for any node u, the following criterion holds:

$$Pr[|\tilde{w}_u - w_u| \le \alpha \max\{w_u, \tau_u\}] \ge 1 - \eta$$

Figure 2:
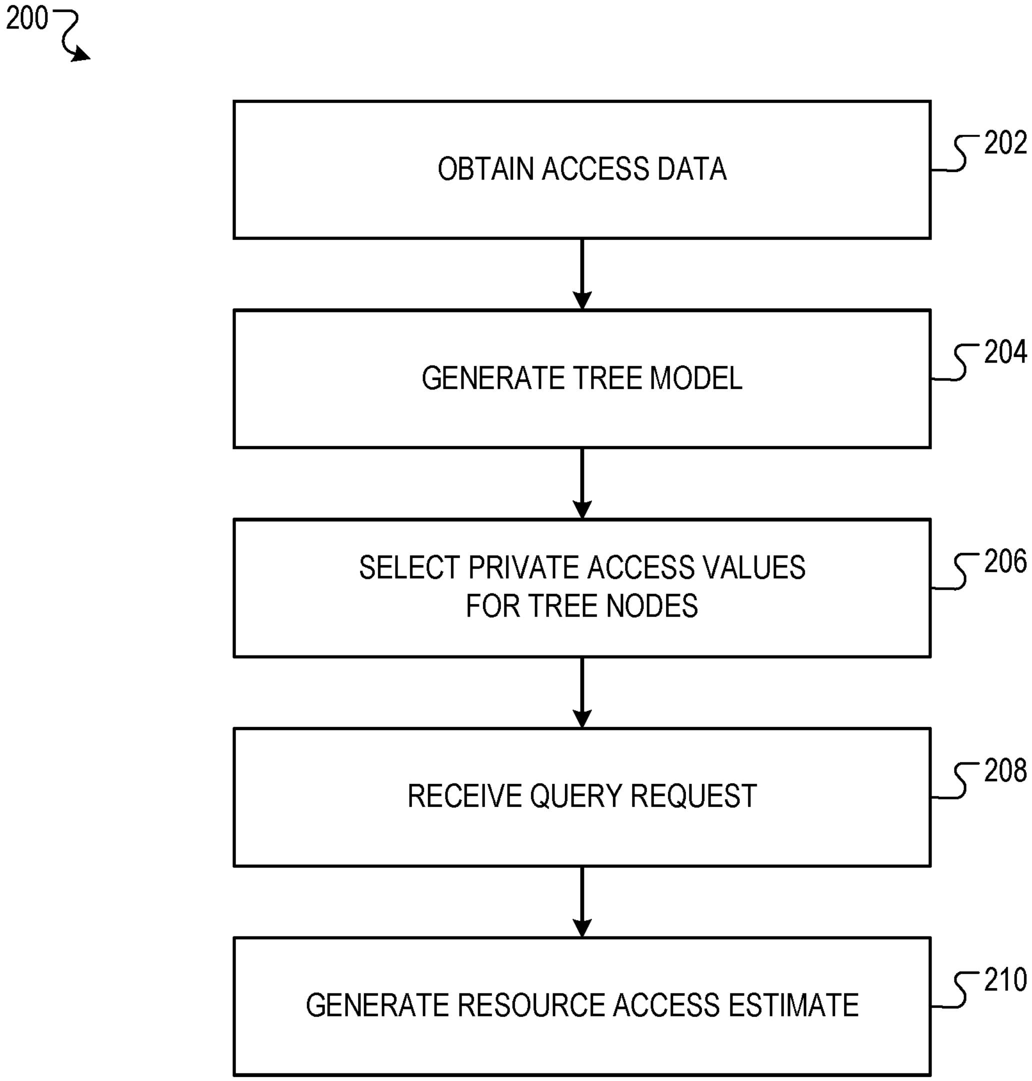
FIG. 2 is a flow diagram of an example process for access estimation.

FIG. 2 is a flow diagram of an example process for access estimation. For convenience, the process 200 will be described as being performed by a system of one or more computers located in one or more locations. For example, a resource estimation system, e.g., the resource estimation system 100 of FIG. 1, appropriately programmed in accordance with this specification, can perform the process 200.

The system obtains access data for a digital resource (step 202). The access data identifies sets of users that accessed the digital resource at time points in a sequence of time points. The sequence of time points can include any appropriate number of time points, e.g., 100 time points, or 1000 time points, or 1,000,000 time points. The time points can be separated, e.g., by uniform values, e.g., of 1 second, or 1 minute, or 1 hour, or non-uniform values. A user can be said to access a digital resource "at a time point," e.g., if the user accesses the digital resource in a time window parametrized by the time point, e.g., a time window defined by the interval of time between the time point and the next time point.

The system can obtain the access data by any appropriate method. For example, the system can monitor user access to the digital resource and update the access data as users access the digital resource. As another example, the system can receive access data from an external source (e.g., a system that generates the access data by monitoring user access to the digital resource).

The system generates a tree model based on the access data (step 204). The system associates each node of the tree model with a respective access value that characterizes a number of users that satisfy a node-specific selection criterion based on accessing the digital resource. An example process for generating the tree model 114 from the access data 102 is described in more detail below with reference to FIG. 4.

Based on the generated tree model 114, the system can determine multiple parameters to ensure that the estimates 106 are both ($\epsilon$, $\delta$)-differentially private and ($\alpha$, $\eta$)-accurate.

The system can receive or select an appropriate minimum threshold, $\tau_{min}$, satisfying:

$$\tau_{min} \geq \frac{648(1+\alpha)^3}{\alpha^3 \epsilon} \max\left\{ 8\ln\left(\frac{4d}{\eta}\right), \ln\left(1 + \frac{2(e^{\epsilon/4}-1)}{\delta}\right) \right\}$$

Where d is the depth of the tree model 114. The estimates 106 can be ($\alpha$, $\eta$)-accurate with respect to the threshold $\tau_{min}$.

The system can receive or select a parameter $\beta$ such that:

$$\beta = \frac{\alpha}{6+5\alpha}$$

The system can receive or select a parameter R, following:

$$R = \frac{2}{\epsilon}\ln\left(1 + \frac{e^{\epsilon/2}-1}{\delta}\right)$$

The system can receive or determine an approximate root access value, M, for tree model 114 following:

$$M = w_{root} + R + n_M$$

Where $w_{root}$ is the access value for the root node of the tree model 114 and $n_M$ is a random variable sampled from a truncated Laplace distribution having parameter $$\frac{2}{\epsilon}$$

and range R. A truncated Laplace distribution having parameter $\sigma$ and range R has density proportional to $$e^{-\frac{|x|}{\sigma}}$$

as restricted to $x \in [-R, R]$.

The system 100 can receive or determine the number of private access values within the set of private access values, l, following:

$$l = \left\lceil \frac{\ln\left(\frac{M}{\alpha\tau_{min}}\right)}{\ln\left(\frac{(1+\alpha)(1-\beta)}{1+\beta}\right)} \right\rceil$$

The system 100 can receive or determine the set of private access values $\{M_0, \ldots, M_l\}$, with each $M_i$ defined following:

$$M_i = \alpha\tau_{min}\left(\frac{(1+\alpha)(1-\beta)}{1+\beta}\right)^i$$

The system selects respective private access values for the each of the nodes in the tree model (step 206). The private access value assigned to a given node approximates the access value for the given node and is selected from a finite set of possible private access values. An example process for selecting private access values for the tree model is described in more detail below with reference to FIG. 5.

The system receives a request to determine a number of users that accessed the digital resource at least a predefined number of times within a time window (step 208).

In response to the request, the system generates an estimate for the number of users that accessed the digital resource at least the predefined number of times within the time window based on private access values associated with nodes in the tree model (step 210). An example process for processing the private access values to generate the estimate is described in more detail below with reference to FIG. 6.

Figure 3:
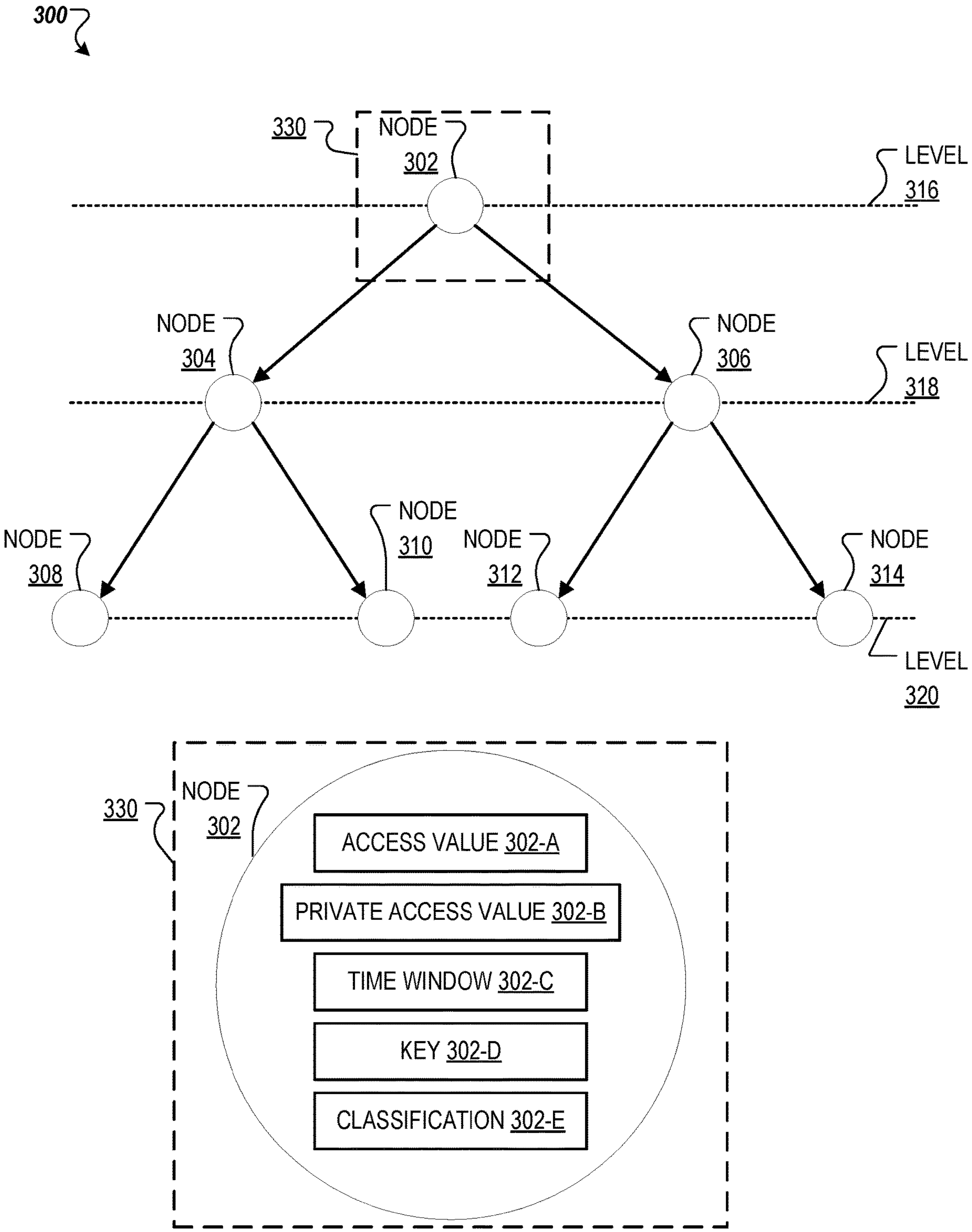
FIG. 3 illustrates an example model tree.

FIG. 3 illustrates an example tree model 300. The model tree 300 includes multiple nodes and structures the nodes using parent-child relationships among the nodes.

The particular tree model 300 depicted in FIG. 3 is provided solely for the purpose of explaining concepts presented in this specification. The actual model trees (e.g., the model tree 114) used in the operation of the systems and processes described in the specification can be significantly larger (in terms of the number of nodes in the tree, the width of the tree, and the depth of the tree) and can have different relationships between the nodes of the tree.

Each node in the tree can have one or more child nodes. For example, nodes 304 and 306 are the child nodes of node 302. As a further example, the nodes 308 and 310 are the child nodes of node 304.

The nodes within the tree 300 that do not have child nodes are referred to as leaf nodes. For example, nodes 308, 310, 312, and 314 are the leaf nodes of the tree 300.

When a given node has one or more child nodes, the given node is referred to as the parent node of the child nodes. Exactly one node of the tree has no parent node and is referred to as the root node of the tree. For example, node 302 is the root node of tree 300.

Aside from the root node 302, every node within the tree 300 has exactly one parent node. For example, the node 302 is the parent node for nodes 304 and 306. As a further example, the node 304 is the parent node for nodes 308 and 310.

The model tree 300 can have any organization suitable for structuring the access data 102 for the purpose of generating the estimate 106. For example, each node of the model tree 300 can have a distinct number of children. As another example, the model tree 300 can be a binary, ternary, or m-ary tree, where the nodes of the model tree 300 have a fixed number of children. As a particular example, the model tree 300 is a binary tree if every node that is not a leaf node of the tree 300 has exactly 2 child nodes.

For every sequence of nodes such that each node in the sequence is the parent node of the next node of the sequence (herein called a connecting sequence), the first node of the sequence is referred to as an ancestor of the last node of the sequence and the last node of the sequence is referred to as a descendent of the first node. For example, nodes 302 and 304 are the ancestors of node 308. As a further example, nodes 308, 310, 312, and 314 are some (but not all) of the descendants of node 302. The root node 302 is an ancestor of all other nodes within the tree 300.

For each pair of nodes where the first node is an ancestor of the second node, there is a unique connecting sequence between the pair. In particular, there is a unique connecting sequence between the root node 302 of the tree 300 and every other node of the tree 300. The length of the connecting sequence between the root node 302 and a given node of the tree 300 is referred to as the depth of the given node within the tree 300. For example, the root node has a depth of one in the tree 300. As another example, the nodes 304 and 306 have depths of two within the tree 300. As another example, the nodes 308, 310, 312, and 314 have depths of three within the tree 300.

A collection of all nodes having a same depth in the tree 300 is referred to as being at the same level in the tree 300. For example, the node 302 is at level 316 in the tree 300. As another example, the nodes 304 and 306 are at level 318 in the tree 300. As another example, the nodes 308, 310, 312, and 314 are at level 320 in the tree 300.

A sub-tree of the tree 300 is a collection of nodes that: (i) have the same parent-child relations between the nodes of the sub-tree as the tree 300 and (ii) has exactly one node, referred to as the root node of the sub-tree, that is an ancestor of all other nodes in the sub-tree. For example, the collection of nodes 304, 308, and 310 forms a sub-tree of the tree 300 that has node 304 as the root node of the sub-tree.

Nodes within a sub-tree of the tree 300 can be referred to using similar terminology as described above. As a particular example, the nodes 304 and 306 can be referred to as the leaf nodes of the sub-tree formed by the collection of nodes 302, 304, and 306.

Two sub-trees of the tree 300 are referred to as disjoint when the two sub-trees share no nodes in common. For example, the sub-tree formed by the collection of nodes 304, 308, and 310 is disjoint to the sub-tree formed by the collection of nodes 306, 312 and 314.

For every given node within the tree 300, there is a unique sub-tree, referred to as the descendant sub-tree for the given node, formed by the given node and all of its descendants within the tree 300. For example, the sub-tree formed by the collection of nodes 304, 308, and 310 is the descendant sub-tree of the node 304. As another example, the tree 300 is the descendant sub-tree of the node 302. As another example, the collection containing only the node 308 is the descendant sub-tree of the node 308.

Multiple data values can be associated with each of the nodes of the tree 300. The inset 330 shows example data values associated with the node 302. For example, an access value 302-A and a private access value 302-B are assigned to the node 302 in the tree 300. As another example, a time window 302-C can be associated with the node 302.

Other data values can be assigned to the nodes of the tree 300 to assist in computing the estimate 106. For example, a query key 302-D can be assigned to the node 302 for use in determining whether the node 302 is associated with relevant information to the query request 104. As another example, a classification 302-E can be assigned to the node 302 as part of the process of selecting the private access value 302-B for the node 302.

The access value assigned to a given node specifies a number of times that users have accessed the digital resource within the time window associated with the node. For example, the access value 302-A specifies the number of times that users have accessed the digital resource within the time window 302-C.

The time window of a given parent node can be the union of the time windows associated with the child nodes of the given parent node and the time windows of the child nodes are referred to as being included within the time-window of the parent node. The tree 300 is referred to as a partition of time windows if: (i) the time windows of each particular node within the tree 300 are included within the time windows of every ancestor of the particular node and (ii) a particular time falls into the time window of at most one node at any given level of the tree 300.

The tree 300 can be, but does not need to be, a binary search tree for time windows of the access data 102. The tree 300 is a binary search tree for time windows of the access data 102 if: (i) the time window of the root node 302 includes every time a user accessed the digital resource as specified by the access data 102, (ii) the tree is a binary tree, and (iii) the tree 300 partitions the time window of the root node 302.

Figure 4:
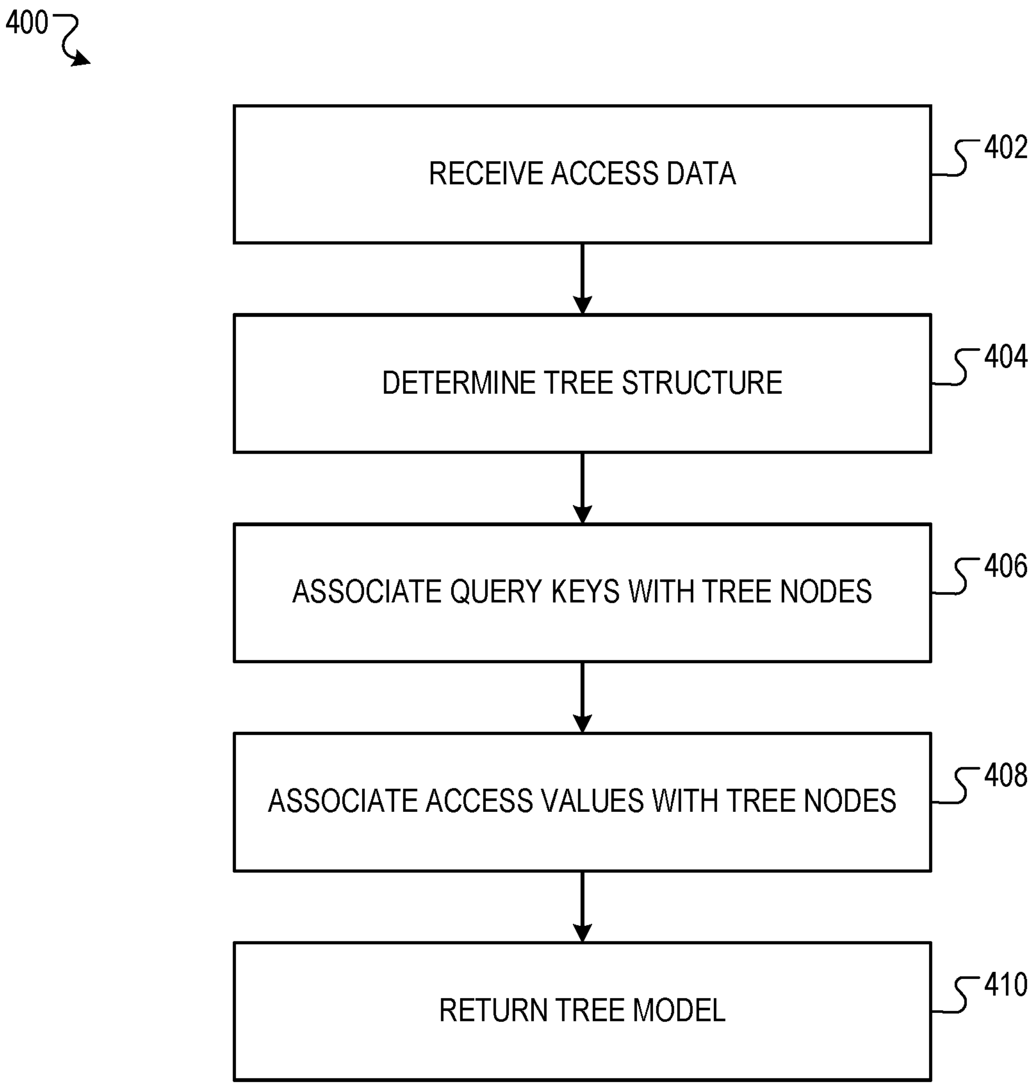
FIG. 4 is a flow diagram of an example process for generating a model tree.

FIG. 4 is a flow diagram of an example process for generating a tree model. For convenience, the process 400 will be described as being performed by a system of one or more computers located in one or more locations. For example, a tree generation system, e.g., the tree generation system 108 of FIG. 1, appropriately programmed in accordance with this specification, can perform the process 400.

The tree generation system receives access data (step 402).

The tree generation system determines the structure for the generated tree model (step 404). In particular, the tree generation system determines a number of nodes for the tree model and determines parent-child relationships for the nodes.

The tree generation system can determine the tree model structure in any of a variety of ways. For example, the tree model structure can be predetermined and the tree generation system can map information from the access data into the predetermined structure of the tree model. As a further example, the tree model may be generated with as a binary search tree with a pre-determined number of leaf nodes associated with time windows of the same length of time.

As another example, the tree model structure can be determined based on the access data. As a further example, tree model structure can follow an iterative generative process. At the first iteration of the iterative generative process, the structure can be initialized as a single root node associated with the entire time window of the access data. At each following iteration, the tree model structure can be updated by adding child nodes for every leaf node of the current structure associated with a time window in which the access data specifies that the users accessed the digital resource more than a minimum number of times. The new child nodes for a given leaf node can be associated with time windows such that the time windows of the new child nodes divide, as evenly as possible, the number of user accesses to the digital resource encompassed by the time window of the given leaf node. The iteration can continue until every leaf node of the structure is associated with a time window encompassing no more than the minimum number of user accesses to the digital resource. The tree structure obtained after the final iteration can be used as the structure for the generated tree model.

The tree generation system can associate query keys to every node in the tree model (step 406). The query key for a particular node identifies whether the particular node is associated with data relevant to generating the estimation 106 in response to the query request 104. As a particular example, the query key for a particular node can characterize the time window associated with the particular node and can identify whether the time window of the particular node falls within a time window specified by the query request 104.

The tree generation system associates access values to every node in the tree model (step 408). In particular, the tree generation system can assign the number of times that users have accessed the digital resource within the time window associated with a particular node as the access value for the particular node.

The tree generation system finally returns the tree model (step 410).

Figure 5:
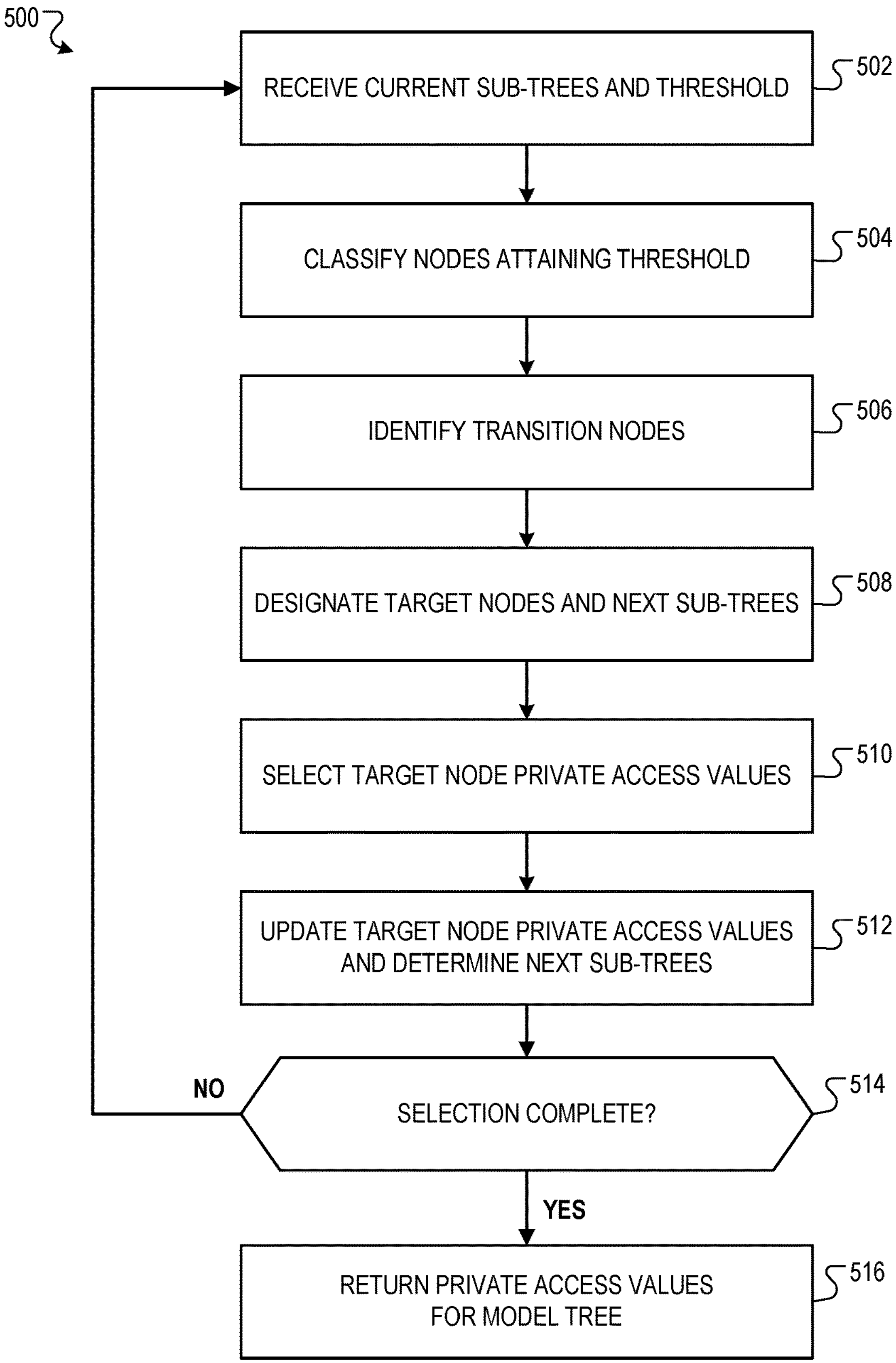
FIG. 5 is a flow diagram of an example process for selecting private access values.

FIG. 5 is a flow diagram of an example process for selecting private access values. For convenience, the process 500 will be described as being performed by a system of one or more computers located in one or more locations. For example, a selection system, e.g., the selection system 110 of FIG. 1, appropriately programmed in accordance with this specification, can perform the process 500.

The selection system can iteratively perform the process 500 over a sequence of iterations. In particular, each iteration of the process 500 can correspond to one of the finite set of private access values. For example, if the set of private access values is the set $\{M_l, \ldots, M_0\}$, the selection system can perform l iterations, with the j-th iteration corresponding to the private access value $M_{l+1-j}$.

At each iteration, the selection system can determine a number of iteration specific parameters.

During the iteration corresponding to the private access value $M_i$, the selection system can receive or determine an iteration specific threshold, $\tau_i$, following:

$$\tau_i = \frac{\alpha\tau_{min}}{1+\beta}\left(\frac{(1+\alpha)(1-\beta)}{1+\beta}\right)^i$$

The selection system can receive or determine a parameter, C, following:

$$C = \left(\frac{(2+\alpha)\beta-\alpha}{1+\beta}\right)^{-2}$$

During the iteration corresponding to the private access value $M_i$, the selection system can receive or determine iteration specific noise and error parameters, $\eta_i$, $\epsilon_i$, and $\delta_i$, following:

$$\eta_i = \frac{\eta}{2^i}$$

$$\epsilon_i = \frac{\epsilon}{2C}i\left(\frac{(1+\alpha)(1-\beta)}{1+\beta}\right)^{i-1}$$

$$\delta_i = \frac{\delta}{2C}i\left(\frac{(1+\alpha)(1-\beta)}{1+\beta}\right)^{i-1}$$

During the iteration corresponding to the private access value $M_i$, the selection system can receive or determine an iteration specific cutoff, $c_i$, and range, $R_i$, following:

$$c_i = \frac{M_i}{(1-\alpha)\tau_i}$$

$$R_i = \frac{2c_i}{\epsilon_i}\ln\left(1+\frac{c_i\left(e^{\epsilon_i/2c_i}-1\right)}{\delta_i}\right)$$

For each iteration, the selection system can receive a current set of sub-trees of the tree model and a current threshold for the iteration (step 502). In some implementations, at the first iteration, the selection system can receive the model tree as the set of sub-trees for the first iteration. In some implementations, at each iteration after the first iteration, the current threshold for the iteration is strictly less than the threshold used for the previous iteration.

For each current sub-tree of the iteration, the selection system can classify each node of the sub-tree based on the current threshold for the iteration (504). The selection system classifies a given node by assigning an appropriate classification to the given node. The selection system classifies a given node using an acceptance criterion based on the current threshold. An example process for classifying the access values of nodes is described in more detail below with reference to FIG. 6.

The selection system can then identify one or more nodes of the tree model as being target nodes for the current iteration based on the classifications the system has assigned to the nodes. The target nodes for the current iteration are the nodes to which the selection system will assign private access values at the end of the current iteration.

In some implementations, the selection system can determine the current target nodes by first identifying one or more transition nodes within the current set of sub-trees for the iteration (step 506). The selection system identifies a particular node in the current set of sub-trees as being a transition node when: (i) the particular node is classified as satisfying the acceptance criterion for the current iteration and (ii) every child note of the particular node is classified as not satisfying the acceptance criterion.

The selection system can then identify nodes within the current set of sub-trees as being target nodes based on the classification of the nodes for the current iteration (step 508). In implementations where the system has identified nodes as transition nodes for the current iteration, the system identifies the current transition nodes as being target nodes for the current iteration. In some implementations where the system has identified nodes as transition nodes for the current iteration, the system can identify each ancestor of each current transition node as being a target node for the current iteration.

The selection system can then select private access values to associate with the target nodes for the current iteration based on the current threshold (step 510). The selection system assigns a private access value to a given node by selecting one private access value for the given node from a finite set of private access values. In some implementations, selects a same private access value for the current iteration and assigns the same private access value to every target node for the current iteration.

In some implementations where the same private access value is assigned to every target node for the current iteration, the selection system can select the same private access value within a certain tolerance of the current threshold. For example, the selection system can assign the private access value $M_{l+1-i}$ to all of the target nodes for the i-th iteration.

The selection system then assigns the private access values for the target nodes of the current iteration (step 512). The selection system can assign the private access values to the corresponding nodes of the tree model.

In some implementations, the selection system can identify the set of sub-trees to be used in the next iteration. In some implementations where the selection system identifies the set of sub-trees for the next iteration, system can select a set of one or more disjoint sub-trees of the tree model where the root node of each sub-tree is a descendant of one of the transition nodes for the current iteration.

The selection system can then determine whether the selection of private access values is complete (step 514). If the selection of private access values is complete (e.g., after l iterations), then selection system can terminate the process 500 and can assign a default private access value (e.g., the private access value $M_0$) to the nodes system did not assign private access values during the iterations. Otherwise, the selection system can proceed to the next iteration of the process 500. In implementations where the selection system identifies the set of sub-trees for the next iteration, the selection system can provide the identified set of sub-trees for use in the next iteration.

When the selection of private access values is complete, the selection system can return the private access values assigned to the nodes of the model tree 114 (step 516).

Figure 6:
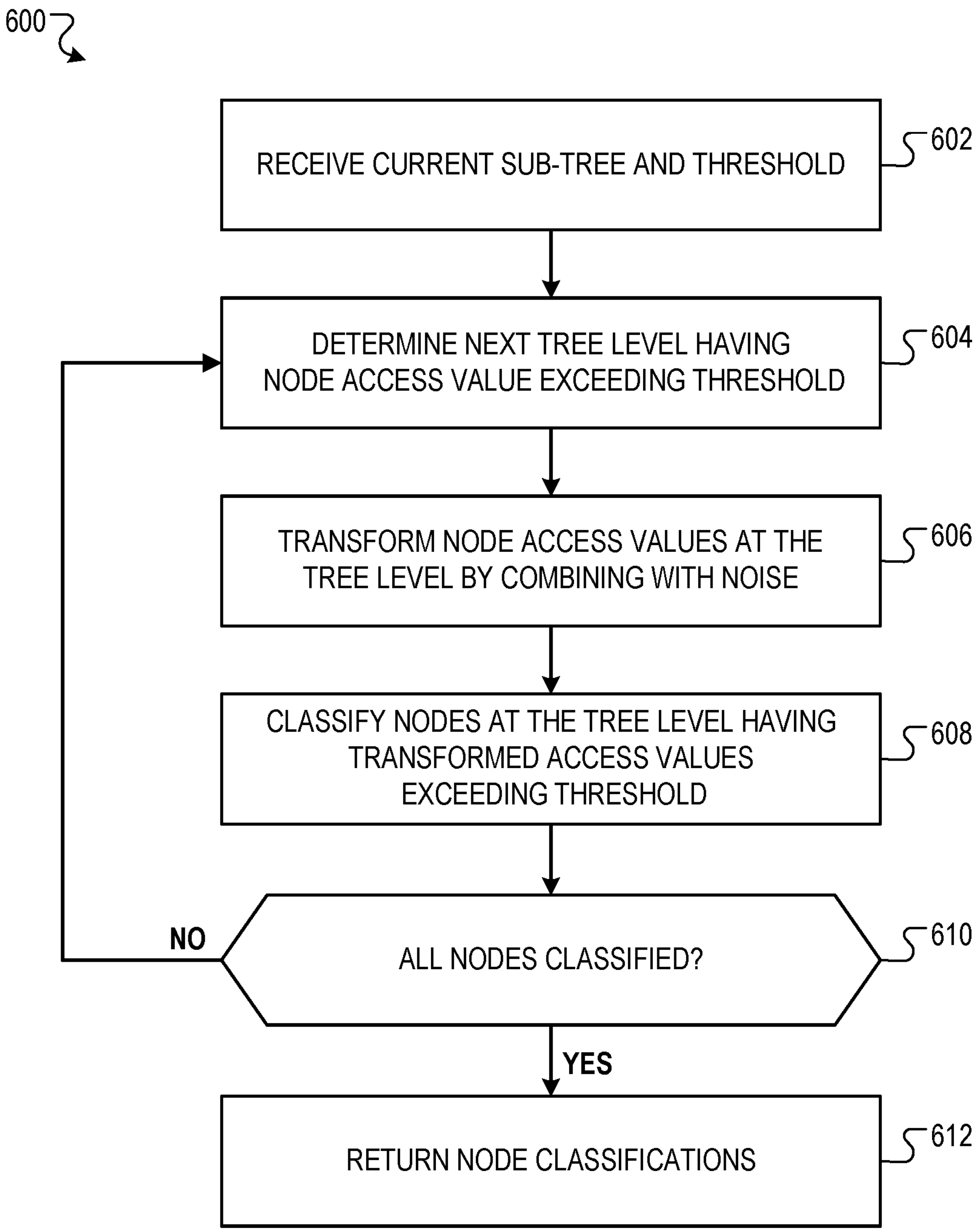
FIG. 6 is a flow diagram of an example process for classifying the access values of nodes.

FIG. 6 is a flow diagram of an example process for classifying the access values of nodes. For convenience, the process 600 will be described as being performed by a system of one or more computers located in one or more locations. For example, a selection system, e.g., the selection system 110 of FIG. 1, appropriately programmed in accordance with this specification, can perform the process 600.

The classification system receives a sub-tree and a current threshold (step 602).

If the root node of the sub-tree has an access value below the current threshold, the classification system can immediately classify all of the nodes of the sub-tree as not satisfying the acceptance criterion.

The classification system can classify the nodes in the sub-tree following a sequence of iterations processing each level of the sub-tree, starting from the deepest level of the sub-tree and continuing to the level of the root node of the sub-tree.

For each level of the sub-tree, the classification system can determine whether the level includes at least one unclassified node having an access value that exceeds the current threshold value (step 604). In some implementations, the classification system can determine whether the level has an unclassified node with an access value exceeding the current threshold using sparse vector techniques, e.g. the sparse vector technique presented as Algorithm 2 by Dwork and Roth in "The Algorithmic Foundations of Differential Privacy", Foundations and Trends in Theoretical Computer Science, Vol. 9 (3-4), 2014. If the level has no unclassified nodes with access values exceeding the current threshold, the classification system can classify all of the nodes at the level as not satisfying the acceptance criterion and immediately begin the iteration for the next level.

The classification system transforms the access value of the nodes at the current level by adding noise to the access value (step 606). In some implementations, the classification system can add noise to a given access value by sampling a noise value from a particular noise distribution and adding the noise value to the access value. The particular noise distribution can be any suitable distribution. For example, the particular noise distribution can be a Gaussian distribution. As another example, the particular noise distribution can be a Laplace distribution. As another example, the particular noise distribution can be a truncated Laplace distribution. As a further example, the particular noise distribution can be a truncated Laplace distribution having parameter $$\frac{2c_i}{\epsilon_i}$$

and range $R_i$.

In some implementations, the classification system can further transform the access values of the nodes by adding one or more offsets to the access values. For example, during the iteration of the process 500 corresponding to the private access value $M_i$, the classification system can add an offset $\Delta_i$ to the access values, where the system determines $\Delta_i$ following:

$$\Delta_i = \frac{16c_i}{\epsilon_i}\ln\left(\frac{2d}{\eta_i}\right)$$

As another example, during the iteration of the process 500 corresponding to the private access value $M_i$, the classification system can add the range $R_i$ to the access values.

The classification system can classify the nodes at the current level based on whether the transformed access values of the node exceed the current threshold (608). When the classification system classifies a particular node as satisfying the acceptance criterion, the system can immediately classify all of the ancestor nodes of the particular node as also satisfying the acceptance criterion.

The classification system can then finish the classification if there are no unclassified nodes remaining in the tree (step 610). If there are still unclassified nodes remaining in the tree, the classification system can continue with the iteration for the next level of the tree.

When the classification finishes, the classification system can return the classifications of the nodes of the received sub-tree (step 612).

Figure 7:
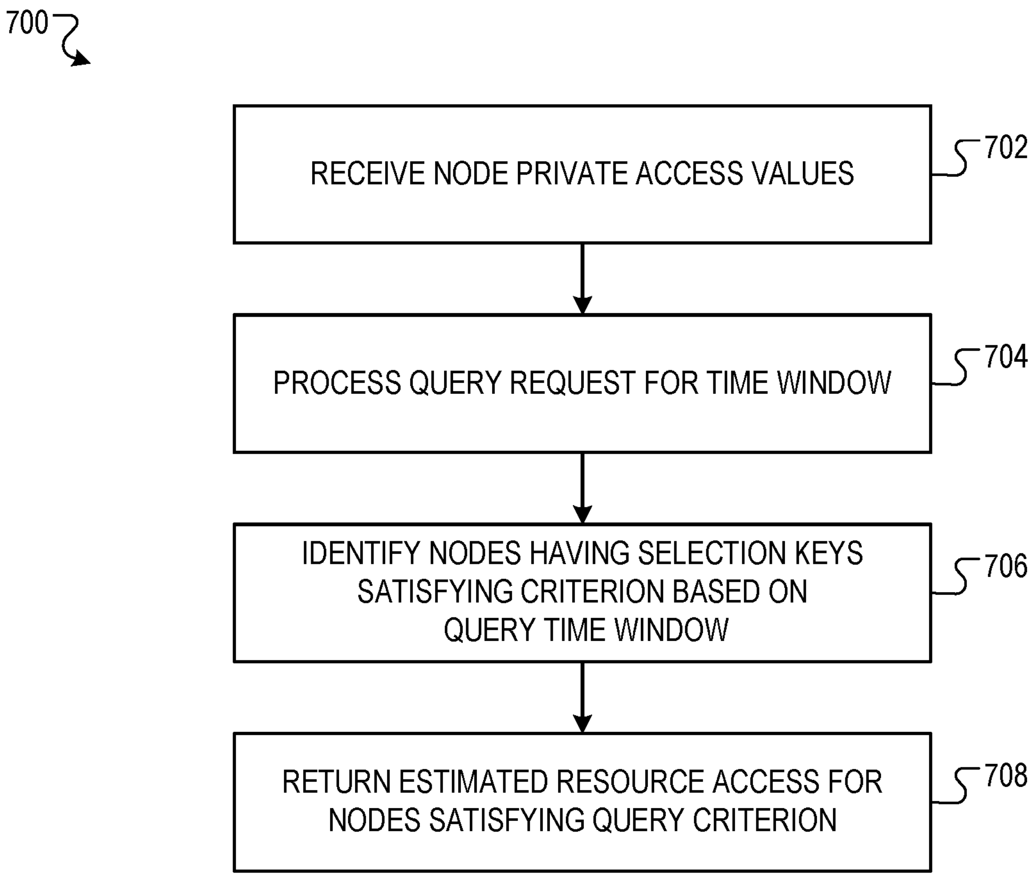
FIG. 7 is a flow diagram of an example process for generating a resource access estimate.

FIG. 7 is a flow diagram of an example process for generating a resource access estimate. For convenience, the process 700 will be described as being performed by a system of one or more computers located in one or more locations. For example, an estimation system, e.g., the estimation system 112 of FIG. 1, appropriately programmed in accordance with this specification, can perform the process 700.

The estimation system receives a tree model and associated private access values (step 702).

The estimation system can process the query request to estimate the number of users that accessed the digital resource in a particular time window and produce a numerical representation of the particular query time window (step 704).

In some implementations, the estimation system can identify the nodes of the tree that are relevant (i.e. satisfy a selection criterion) to the query request by processing the query keys associated to each node (step 706). A node can be relevant to the query (i.e., satisfy the selection criterion) if it is assigned a query key characterizing the node as falling within the time window specified by the query request. The estimation system can determine which nodes are relevant to the numerical representation of the query time window by processing the numerical representation of the query time window alongside the query keys assigned to the nodes. An example algorithm for determining which nodes are relevant to the query is presented by Ghazi et al, in "Private Counting of Distinct and k-Occurring Items in Time Windows", arXiv preprint, 2022.

The estimation system then returns an estimation for the query request based on the private access values assigned to the nodes of the tree relevant to the query request (step 708). In some implementations, the estimation can be based on a combination of the private access values assigned to nodes relevant to the request. In some implementations, the estimation can be a sum of private access values assigned to nodes relevant to the request. In some implementations, the relevant nodes can be limited to the relevant leaf nodes of the tree model.

Figure 8:
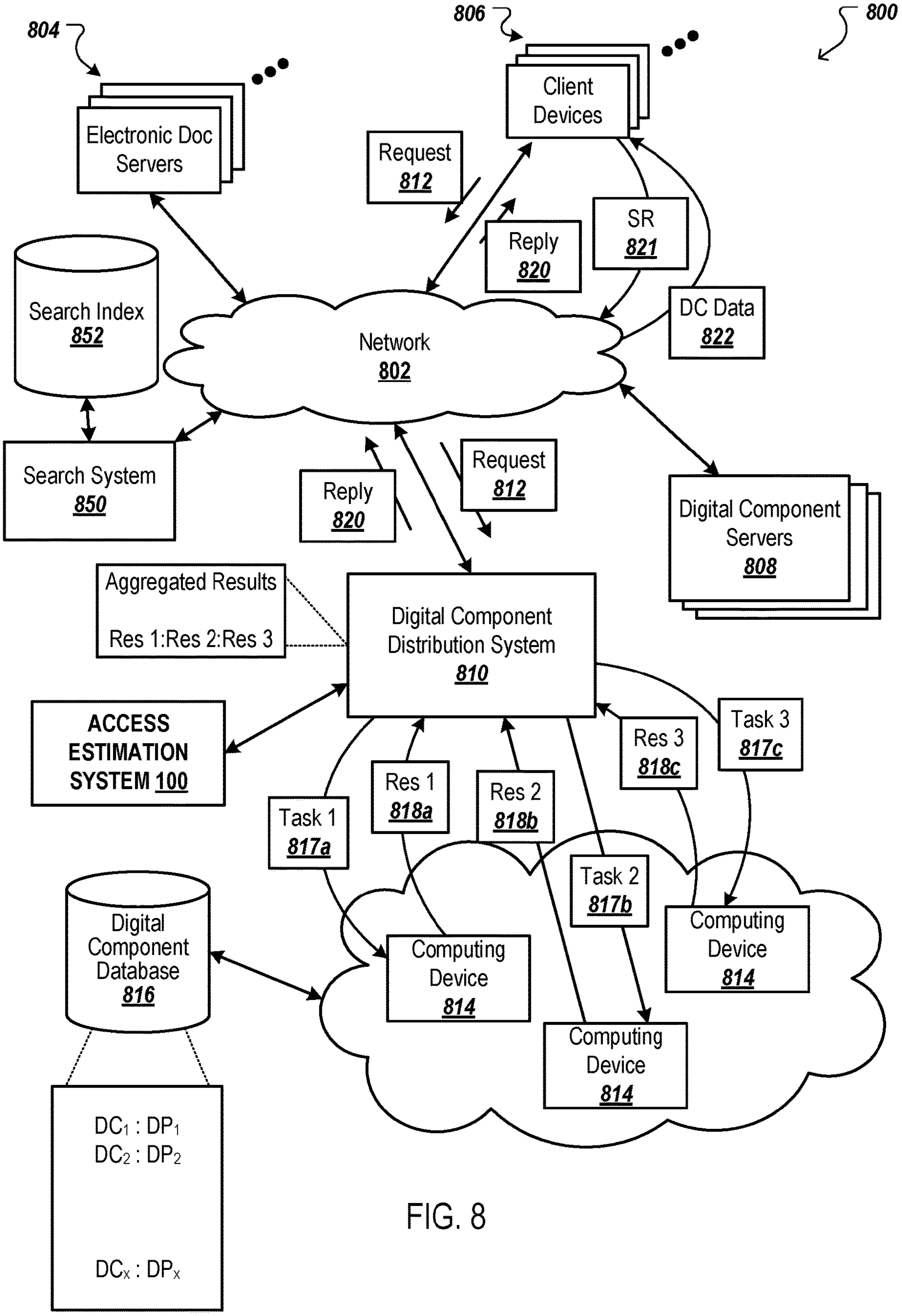
FIG. 8 is a block diagram of an example environment in which digital components are distributed.

FIG. 8 is a block diagram of an example environment 800 in which digital components are transmitted for presentation with electronic documents.

The example environment 800 includes a network 802, such as a local area network (LAN), a wide area network (WAN), the Internet. or a combination thereof. The network 802 connects electronic document servers 804, client devices 806, digital component servers 808, and a digital component distribution system 810 (also referred to as a "distribution system" 810). The example environment 800 may include many different electronic document servers 804, client devices 806, and digital component servers 808.

A client device 806 is an electronic device that is capable of requesting and receiving resources over the network 802. Example client devices 806 include personal computers, mobile communication devices (e.g., mobile phones), and other devices that can send and receive data over the network 802. A client device 806 typically includes a user application, such as a web browser, to facilitate the sending and receiving of data over the network 802, but native applications executed by the client device 806 can also facilitate the sending and receiving of data over the network 802.

An electronic document is data that presents a set of content at a client device 806. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 806 by electronic document servers 804 ("Electronic Doc Servers"). For example, the electronic document servers 804 can include servers that host publisher websites. In this example, the client device 806 can initiate a request for a given publisher webpage, and the electronic server 804 that hosts the given publisher webpage can respond to the request by sending machine executable instructions that initiate presentation of the given webpage at the client device 806.

In another example, the electronic document servers 804 can include app servers from which client devices 806 can download apps. In this example, the client device 806 can download files required to install an app at the client device 806, and then execute the downloaded app locally.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include one or more tags or scripts that cause the client device 806 to request content from the data source when the given electronic document is processed (e.g., rendered or executed) by a client device 806. The client device 806 integrates the content obtained from the data source into the given electronic document to create a composite electronic document including the content obtained from the data source.

In some situations, a given electronic document can include one or more digital component tags or digital component scripts that reference the digital component distribution system 810. In these situations, the digital component tags or digital component scripts are executed by the client device 806 when the given electronic document is processed by the client device 806. Execution of the digital component tags or digital component scripts configures the client device 806 to generate a request for one or more digital components 812 (referred to as a "component request"), which is transmitted over the network 802 to the digital component distribution system 810. For example, a digital component tag or digital component script can enable the client device 806 to generate a packetized data request including a header and payload data. The component request 812 can include event data specifying features such as a name (or network location) of a server from which the digital component is being requested, a name (or network location) of the requesting device (e.g., the client device 806), and/or information that the digital component distribution system 810 can use to select one or more digital components provided in response to the request. The component request 812 is transmitted, by the client device 806, over the network 802 (e.g., a telecommunications network) to a server of the digital component distribution system 810.

The component request 812 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 810. Similarly, event data specifying keywords associated with the electronic document ("document keywords") or entities (e.g., people, places, or things) that are referenced by the electronic document can also be included in the component request 812 (e.g., as payload data) and provided to the digital component distribution system 810 to facilitate identification of digital components that are eligible for presentation with the electronic document. The event data can also include a search query that was submitted from the client device 806 to obtain a search results page, and/or data specifying search results and/or textual, audible, or other visual content that is included in the search results.

Component requests 812 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 812 can be transmitted, for example, over a packetized network, and the component requests 812 themselves can be formatted as packetized data having a header and payload data. The header can specify a destination of the packet and the payload data can include any of the information discussed above.

The component distribution system 810 chooses digital components that will be presented with the given electronic document in response to receiving the component request 812 and/or using information included in the component request 812. In some implementations, a digital component is selected (using the techniques described herein) in less than a second to avoid errors that could be caused by delayed selection of the digital component. For example, delays in providing digital components in response to a component request 812 can result in page load errors at the client device 806 or cause portions of the electronic document to remain unpopulated even after other portions of the electronic document are presented at the client device 806. Also, as the delay in providing the digital component to the client device 806 increases, it is more likely that the electronic document will no longer be presented at the client device 806 when the digital component is delivered to the client device 806, thereby negatively impacting a user's experience with the electronic document. Further, delays in providing the digital component can result in a failed delivery of the digital component, for example, if the electronic document is no longer presented at the client device 806 when the digital component is provided.

In some implementations, the digital component distribution system 810 is implemented in a distributed computing system that includes, for example, a server and a set of multiple computing devices 814 that are interconnected and identify and distribute digital components in response to requests 812. The set of multiple computing devices 814 operate together to identify a set of digital components that are eligible to be presented in the electronic document from a corpus of millions of available digital components (DC1-x). The millions of available digital components can be indexed, for example, in a digital component database 816. Each digital component index entry can reference the corresponding digital component and/or include distribution parameters (DP1-DPx) that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 812) in order for the digital component to be eligible for presentation. In other words, the distribution parameters are used to trigger distribution (e.g., transmission) of the digital components over the network 802. The distribution parameters can also require that the component request 812 include information specifying a particular geographic region (e.g., country or state) and/or information specifying that the component request 812 originated at a particular type of client device (e.g., mobile device or tablet device) in order for the digital component to be eligible for presentation.

The distribution parameters can also specify an eligibility value (e.g., ranking score, bid, or some other specified value) that is used for evaluating the eligibility of the digital component for distribution/transmission (e.g., among other available digital components), for example, by the component evaluation process. In some situations, the eligibility value can specify a maximum amount of compensation that a provider of the digital component is willing to submit in response to the transmission of the digital component (e.g., for each instance of specific events attributed to the presentation of the digital component, such as user interaction with the digital component).

The identification of the eligible digital component can be segmented into multiple tasks **817*a*-817*c* that are then assigned among computing devices within the set of multiple computing devices 814. For example, different computing devices in the set 814 can each analyze a different portion of the digital component database 816 to identify various digital components having distribution parameters that match information included in the component request 812. In some implementations, each given computing device in the set 814 can analyze a different data dimension (or set of dimensions) and pass (e.g., transmit) results (Res 1-Res 3) 818*a*-818*c* of the analysis back to the digital component distribution system 810. For example, the results 818*a*818*c* provided by each of the computing devices in the set 814** may identify a subset of digital components that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 810 aggregates the results **818*a*-818*c* received from the set of multiple computing devices 814 and uses information associated with the aggregated results to: (i) select one or more digital components that will be provided in response to the request 812, and (ii) determine transmission requirements for the one or more digital components. For example, the digital component distribution system 810 can select a set of winning digital components (one or more digital components) based on the outcome of one or more component evaluation processes. In turn, the digital component distribution system 810 can generate and transmit, over the network 802, reply data 820 (e.g., digital data representing a reply) that enables the client device 806 to integrate the set of winning digital components into the given electronic document, such that the set of winning digital components and the content of the electronic document are presented together at a display of the client device 806**.

In some implementations, the client device 806 executes instructions included in the reply data 820, which configures and enables the client device 806 to obtain the set of winning digital components from one or more digital component servers. For example, the instructions in the reply data 820) can include a network location (e.g., a Uniform Resource Locator (URL)) and a script that causes the client device 806 to transmit a server request (SR) 821 to the digital component server 808 to obtain a given winning digital component from the digital component server 808. In response to the request, the digital component server 808 will identify the given winning digital component specified in the server request 821 (e.g., within a database storing multiple digital components) and transmit, to the client device 806, digital component data (DC Data) 822 that presents the given winning digital component in the electronic document at the client device 806.

To facilitate searching of electronic documents, the environment 800 can include a search system 850 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 852 (e.g., hardware memory device(s)). Data that are associated with an electronic document is data that represents content included in the electronic document and/or metadata for the electronic document.

Client devices 806 can submit search queries to the search system 850 over the network 802. In response, the search system 850 accesses the search index 852 to identify electronic documents that are relevant to the search query. The search system 850 identifies the electronic documents in the form of search results and returns the search results to the client device 806 in a search results page. A search result is data generated by the search system 850 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 806. In some situations, the search system 850 can be part of, or interact with, an application store (or an online portal) from which applications can be downloaded for install at a client device 806 in order to present information about downloadable applications that are relevant to a submitted search query. Like other electronic documents, search results pages can include one or more slots in which digital components (e.g., advertisements, video clips, audio clips, images, or other digital components) can be presented.

To select a digital component to be transmitted in response to a component request, the distribution system 810 may identify a set of digital components that are eligible to be transmitted in response to the component request. The distribution system 810 may then select one or more of the eligible digital components to be transmitted through. e.g., an auction procedure. In some implementations, the distribution system 810 performs an auction procedure by ranking the eligible digital components in accordance with their respective eligibility values, and selecting one or more highest-ranked digital components to be transmitted in response to the component request.

For example, the distribution system 810 may identify digital components A. B. and C as eligible to be transmitted in response to a component request. In this example, digital component A has an eligibility value of 5, digital component B has an eligibility value of 1, and digital component C has an eligibility value of 5.5, where the eligibility values of the digital components represent bids associated with the digital components. The distribution system 810 may rank (e.g., in descending order) the digital components in accordance with their respective eligibility values as: C, A, B. Finally, the distribution system 810 may select the highest ranked digital component C for transmission in response to the component request.

After selecting a digital component to be transmitted in response to a digital component request, the distribution system 810 determines a transmission requirement for the selected digital component. A transmission requirement specifies an action to be performed by the provider of a digital component in response to a transmission of the digital component. For example, the transmission requirement may specify that the provider of the digital component submit an amount of compensation in response to the transmission of the digital component. In some cases, the amount of compensation specifies an amount to be submitted for each instance of specific events attributed to the presentation of the digital component (e.g., user interactions with the digital component).

The distribution system 810 may determine the transmission requirement of the selected digital component based on the eligibility value of the selected digital component and/or the eligibility values of the other digital components that were determined as eligible to be transmitted in response to the component request. For example, the distribution system 810 may identify digital components A. B. and C as eligible for transmission in response to a digital component request, where A. B. and C have respective eligibility values of 5, 1, and 5.5. The distribution system 810 may select digital component C for transmission (since it has the highest eligibility value), and may determine the transmission requirement for digital component C to be the next highest eligibility value from amongst the eligibility values of the eligible digital components. In this example, next highest eligibility value is $5 (i.e., the eligibility value of digital component A), and therefore the distribution system 810 may determine the transmission requirement of digital component C to be $5.

As described above, the distribution system 810 may identify a set of digital components that are eligible to be transmitted for presentation in an electronic document in response to a digital component request based on distribution parameters corresponding to each digital component. In some cases, the distribution parameters corresponding to a digital component may include a keyword cluster (i.e., a set of multiple keywords). The distribution system 810 may determine that one or more keywords from the keyword cluster must be matched (e.g., by electronic documents, document keywords, or terms specified in a digital component request) in order for the digital component to be eligible for transmission.

For example, the distribution system 810 may receive a digital component request which includes a specific keyword. In this example, the distribution system 810 may determine that a particular digital component with distribution parameters specifying a keyword cluster is eligible for transmission in response to the digital component request only if the specific keyword is included in the keyword cluster.

In some implementations, the distribution system 810 enables providers of digital components to set distribution parameters specifying keyword clusters from a predetermined set of keyword clusters. The keyword clusters output by the clustering system 100 may define a grouping of keywords into semantically related keyword clusters. For example, a keyword cluster can define an assignment of the keywords “shoes”, “shoe”, “footwear”, “boots”, “cleats”, “heels”, “slippers”, “sneakers”, and the like, to the same cluster.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs. i.e., one or more modules of computer program instructions encoded on a tangible storage medium which may be non-transitory for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry. e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data. e.g., magnetic, magneto-optical disks, or optical disks. However, a computer need not have such devices. Moreover, a computer can be embedded in another device. e.g., a mobile telephone, a personal digital assistant (PDA), a mobile audio or video player, a game console, a Global Positioning System (GPS) receiver, or a portable storage device. e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device. e.g., a CRT (cathode ray tube) or LCD (liquid crystal display) monitor, for displaying information to the user and a keyboard and a pointing device. e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

obtaining access data for a digital resource, wherein the access data comprises, for each time point in a sequence of time points, data identifying a set of users that accessed the digital resource at the time point;

generating a tree model based on the access data, wherein each node of the tree model is associated with a respective access value that characterizes a number of users that satisfy a node-specific selection criterion based on accessing the digital resource;

selecting, for each node in the tree model, a respective private access value for the node that: (i) is an approximation of the access value for the node, and (ii) is selected from a finite set of possible private access values, wherein selecting the respective private access value for each node comprises, at each of one or more iterations:

identifying one or more transition nodes in the tree model, wherein each transition node (i) is classified as satisfying an acceptance criterion based on a current threshold value for the iteration, and (ii) does not have child nodes that are classified as satisfying the acceptance criterion, wherein classifying whether the access value for a node satisfies the acceptance criterion comprises generating a noise-transformed version of the access value to prevent leakage of individual user information, and determining if the noise-transformed version of the access value exceeds the current threshold value for the iteration;

designating as target nodes for the iteration each identified transition node and each node that is an ancestor to an identified transition node; and assigning a common private access value to each target node identified at the iteration, wherein the common private access value is selected based on the current threshold value;

receiving a request to determine a number of users that accessed the digital resource at least a predefined number of times within a time window; and in response to the request:

generating an estimate for the number of users that accessed the digital resource at least the predefined number of times within the time window based on private access values associated with one or more nodes in the tree model.

2. The method of claim 1, wherein the one or more iterations comprise a sequence of iterations starting from a first iteration, and wherein at each of the one or more iterations the method further comprises receiving a current set of one or more sub-trees of the tree model, and wherein the classifying whether the access value for the node satisfies the acceptance criterion is performed for each node in each sub-tree in the current set of one or more sub-trees.

3. The method of claim 2, wherein at the first iteration in the sequence of iterations, the current set of sub-trees comprises the tree model.

4. The method of claim 2, further comprising:

identifying a next set of one or more sub-trees of the tree model, based on the classifications of the nodes in the sub-trees in the current set of sub-trees; and providing the next set of sub-trees for processing at a next iteration in the sequence of iterations.

5. The method of claim 2, wherein for each iteration after a first iteration in the sequence of iterations:

the current threshold value for the next iteration is less than the current threshold value for a preceding iteration in the sequence of iterations.

6. The method of claim 1, wherein the common private access value is within a tolerance range around the current threshold value.

7. The method of claim 4, wherein identifying a next set of one or more sub-trees of the tree model based on the classifications of the nodes in the sub-trees in the current set of sub-trees comprises, for each identified transition node:

designating one or more disjoint sub-trees of the transition node as being included in the next set of sub-trees.

8. The method of claim 2, wherein classifying whether the access value for the node satisfies the acceptance criterion further comprises, for one or more levels in one or more sub-trees in the current set of sub-trees:

determining that the level in the sub-tree includes at least one node having an access value that exceeds the current threshold value; and in response to determining that the level in the sub-tree includes at least one node having an access value that exceeds the current threshold value, generating the noise-transformed version of the access value for each node at the level, comprising combining noise with the access value for the node.

9. The method of claim 8, wherein generating the noise-transformed version of the access value for each node at the level further comprises adding one or more offsets to the access value for the node.

10. The method of claim 8, wherein combining noise with the access value for the node comprises:

sampling a noise value from a probability distribution; and adding the sampled noise value to the access value for the node.

11. The method of claim 10, wherein the probability distribution is a truncated Laplace distribution.

12. The method of claim 8, wherein determining that the level in the sub-tree includes at least one node having an access value that exceeds the current threshold value comprises:

determining that the level in the sub-tree includes at least one node having an access value that exceeds the current threshold value using a sparse vector technique.

13. The method of claim 1, wherein for each node of the tree model:

the node is associated with a respective key that specifies one or more time intervals; and the node-specific selection criterion for the node based on the one or more time intervals specified by the key for the node.

14. The method of claim 13, wherein generating the estimate for the number of users that accessed the digital resource at least the predefined number of times within the time window based on private access values associated with one or more nodes in the tree model comprises:

identifying a plurality of nodes in the tree model that each have a respective key which satisfies a selection criterion based on the time window;

determining a combination of the private access values associated with the identified nodes; and generating the estimate for the number of users based at least in part on the combination of the private access values associated with the identified nodes.

15. The method of claim 14, wherein determining the combination of the private access values associated with the identified nodes comprises:

determining a sum of the private access values associated with the identified nodes.

16. A system comprising:

one or more computers; and one or more storage devices communicatively coupled to the one or more computers, wherein the one or more storage devices store instructions that, when executed by the one or more computers, cause the one or more computers to perform operations comprising:

obtaining access data for a digital resource, wherein the access data comprises, for each time point in a sequence of time points, data identifying a set of users that accessed the digital resource at the time point;

generating a tree model based on the access data, wherein each node of the tree model is associated with a respective access value that characterizes a number of users that satisfy a node-specific selection criterion based on accessing the digital resource;

selecting, for each node in the tree model, a respective private access value for the node that: (i) is an approximation of the access value for the node, and (ii) is selected from a finite set of possible private access values, wherein selecting the respective private access value for each node comprises, at each of one or more iterations:

identifying one or more transition nodes in the tree model, wherein each transition node (i) is classified as satisfying an acceptance criterion based on a current threshold value for the iteration, and (ii) does not have child nodes that are classified as satisfying the acceptance criterion, wherein classifying whether the access value for a node satisfies the acceptance criterion comprises generating a noise-transformed version of the access value to prevent leakage of individual user information, and determining if the noise-transformed version of the access value exceeds the current threshold value for the iteration;

designating as target nodes for the iteration each identified transition node and each node that is an ancestor to an identified transition node; and assigning a common private access value to each target node identified at the iteration, wherein the common private access value is selected based on the current threshold value;

receiving a request to determine a number of users that accessed the digital resource at least a predefined number of times within a time window; and in response to the request:

generating an estimate for the number of users that accessed the digital resource at least the predefined number of times within the time window based on private access values associated with one or more nodes in the tree model.

17. One or more non-transitory computer storage media storing instructions that when executed by one or more computers cause the one or more computers to perform operations comprising:

obtaining access data for a digital resource, wherein the access data comprises, for each time point in a sequence of time points, data identifying a set of users that accessed the digital resource at the time point;

generating a tree model based on the access data, wherein each node of the tree model is associated with a respective access value that characterizes a number of users that satisfy a node-specific selection criterion based on accessing the digital resource;

selecting, for each node in the tree model, a respective private access value for the node that: (i) is an approximation of the access value for the node, and (ii) is selected from a finite set of possible private access values, wherein selecting the respective private access value for each node comprises, at each of one or more iterations:

identifying one or more transition nodes in the tree model, wherein each transition node (i) is classified as satisfying an acceptance criterion based on a current threshold value for the iteration, and (ii) does not have child nodes that are classified as satisfying the acceptance criterion, wherein classifying whether the access value for a node satisfies the acceptance criterion comprises generating a noise-transformed version of the access value to prevent leakage of individual user information, and determining if the noise-transformed version of the access value exceeds the current threshold value for the iteration;

designating as target nodes for the iteration each identified transition node and each node that is an ancestor to an identified transition node; and assigning a common private access value to each target node identified at the iteration, wherein the common private access value is selected based on the current threshold value;

receiving a request to determine a number of users that accessed the digital resource at least a predefined number of times within a time window; and in response to the request:

generating an estimate for the number of users that accessed the digital resource at least the predefined number of times within the time window based on private access values associated with one or more nodes in the tree model.

18. The non-transitory computer storage media of claim 17, wherein the one or more iterations comprise a sequence of iterations starting from a first iteration, and wherein at each of the one or more iterations the operations further comprise receiving a current set of one or more sub-trees of the tree model, and wherein the classifying whether the access value for the node satisfies the acceptance criterion is performed for each node in each sub-tree in the current set of one or more sub-trees.

19. The non-transitory computer storage media of claim 17, wherein at a first iteration in the sequence of iterations, the current set of sub-trees comprises the tree model.

20. The non-transitory computer storage media of claim 17, the operations further comprising:

identifying a next set of one or more sub-trees of the tree model, based on the classifications of the nodes in the sub-trees in the current set of sub-trees; and providing the next set of sub-trees for processing at a next iteration in the sequence of iterations.

* * * * *